(12) United States Patent
Guo et al.

(10) Patent No.: US 7,496,939 B2
(45) Date of Patent: Feb. 24, 2009

(54) ENERGY DELIVERY MECHANISM

(75) Inventors: Bin-Hai Guo, Guangdong (CN); Dai-Yue Yin, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 448 days.

(21) Appl. No.: 11/308,665

(22) Filed: Apr. 19, 2006

(65) Prior Publication Data
US 2007/0012131 A1   Jan. 18, 2007

(30) Foreign Application Priority Data
Jul. 15, 2005   (CN) .................. 2005 1 0036042

(51) Int. Cl.
*G11B 17/04* (2006.01)
(52) U.S. Cl. ..................................... 720/664
(58) Field of Classification Search ............... 720/664, 720/661, 607, 660, 668, 673, 706, 672, 683, 720/685
See application file for complete search history.

(56) References Cited

U.S. PATENT DOCUMENTS

| 3,999,444 | A | 12/1976 | Willman |
| 5,357,821 | A | 10/1994 | Haka et al. |
| 7,024,673 | B2 * | 4/2006 | Dupper et al. ............ 720/664 |
| 7,398,538 | B2 * | 7/2008 | Loh et al. ................. 720/664 |
| 2007/0204282 | A1 * | 8/2007 | Storz ....................... 720/664 |

FOREIGN PATENT DOCUMENTS

CN        2622486 Y    6/2004

* cited by examiner

*Primary Examiner*—Allen T Cao
(74) *Attorney, Agent, or Firm*—Winston Hsu

(57) ABSTRACT

An energy delivery mechanism includes a first driven gear, a second driven gear, and a connecting member for interconnecting the first driven gear and the second driven gear. The connecting member is secured to the first driven gear, and detachably engaged with the second driven gear. The connecting member is prevented from rotating relative to the second driven gear by static friction existing between the connecting member and the second driven gear.

20 Claims, 5 Drawing Sheets

ENERGY DELIVERY MECHANISM

FIELD OF THE INVENTION

This invention relates to energy delivery mechanisms and, more particularly, to an energy delivery mechanism for an information recording and/or reproducing apparatus.

DESCRIPTION OF RELATED ART

Over the past decades, various information recording and/or reproducing apparatus, such as digital versatile disc (DVD) recorders and/or players, video compact disc (VCD) recorders and/or players, compact disc (CD) recorders and/or players, mini disc (MD) recorders and/or players, have become widely used. A general storage medium player includes a movable pick-up unit for recording information onto or reproducing information from discs, and a driving unit for driving the pick-up unit to move.

Referring to FIG. 5, an information recording and/or reproducing apparatus includes a driving unit 80, a base plate 82, a turntable 84, a pick-up unit 86, and a guiding rod 88 for guiding the pick-up unit 86 to move back and forth. The driving unit 80 is mounted on the base plate 82, and includes a spindle motor 800, a driving motor 806, a driving gear 807, and an energy delivery mechanism 808. The spindle motor 800 forms a rotor 802 at a center thereof. The rotor 802 extends through the base plate 82 to rotatably support the turntable 84. The driving motor 806 is used for converting electrical energy into mechanical energy for driving the driving gear 807 to rotate. The energy delivery mechanism 808 engages with both the driving gear 807 and the pick-up unit 86, and includes a gear set 810 and a rack 812. The gear set 810 includes two or more duplicate gears. A first duplicate gear can be in mesh with the driving gear 807 or connected to the driving gear 807 via a pulley. A second duplicate gear is in mesh with the rack 812. The second duplicate gear can be in mesh with the first duplicate gear or connected to the first duplicate gear via a pulley. The rack 812 connects to the pick-up unit 86. The mechanical energy from the driving motor 806 brings the driving gear 807 to rotate. Since the first duplicate gear is in mesh with the driving gear, torsion is generated and applied on the first duplicate gear. Sequentially, the torsion is transmitted to the second duplicate gear and then the rack 812. The rack 812 is thus forced to move back and forth along the guiding rod 88.

Since teeth of the gear set 810 and the rack 812 are generally made of plastic materials, teeth brokenness is liable to occur when being applied excessive torsion. Yet when the pick-up unit 86 moves to an end of the guiding rod 88, moment of inertia will create an instant torsion on the rack 812. When the instant torsion exceeds a given value, it may cause teeth brokenness. Furthermore, an unexpected sudden shock of the information recording and/or reproducing apparatus may cause the pick-up unit 86 to move to an end of the guiding rod 88. This movement of the pick-up unit 86 will generate an instant counter torsion on the second duplicate gear. Usually this instant counter torsion is extremely great that may cause teeth brokenness of the gear set 810 and the rack 812.

Similarly, aforementioned teeth brokenness also exists in other energy delivery systems, such as games, or vehicles.

Therefore, a heretofore unaddressed need exists in the industry to address the aforementioned deficiencies and inadequacies.

SUMMARY OF INVENTION

An energy delivery mechanism includes a first driven gear, a second driven gear, and a connecting member for interconnecting the first driven gear and the second driven gear. The connecting member is secured to the first driven gear, and detachably engaged with the second driven gear. The connecting member is prevented from rotating relative to the second driven gear by static friction existing between the connecting member and the second driven gear.

An information recording and/or reproducing apparatus includes a base plate, a pick-up unit movably mounted on the base plate, a driving motor for converting electrical energy into mechanical energy, and an energy delivery mechanism for delivering the energy to the pick-up unit to drive the pick-up unit to move relative to the base plate. The energy delivery mechanism includes a first driven gear, a second driven gear, and a connecting member. The driving gear is secured to the first driven gear, and detachably engaging with the second driven gear. The connecting member is prevented from rotating relative to the second driven gear by static friction existing between the connecting member and the second driven gear.

Other advantages and novel features will become more apparent from the following detailed description of preferred embodiments when taken in conjunction with the accompanying drawings, in which:

DETAILED DESCRIPTION

Figure 1:
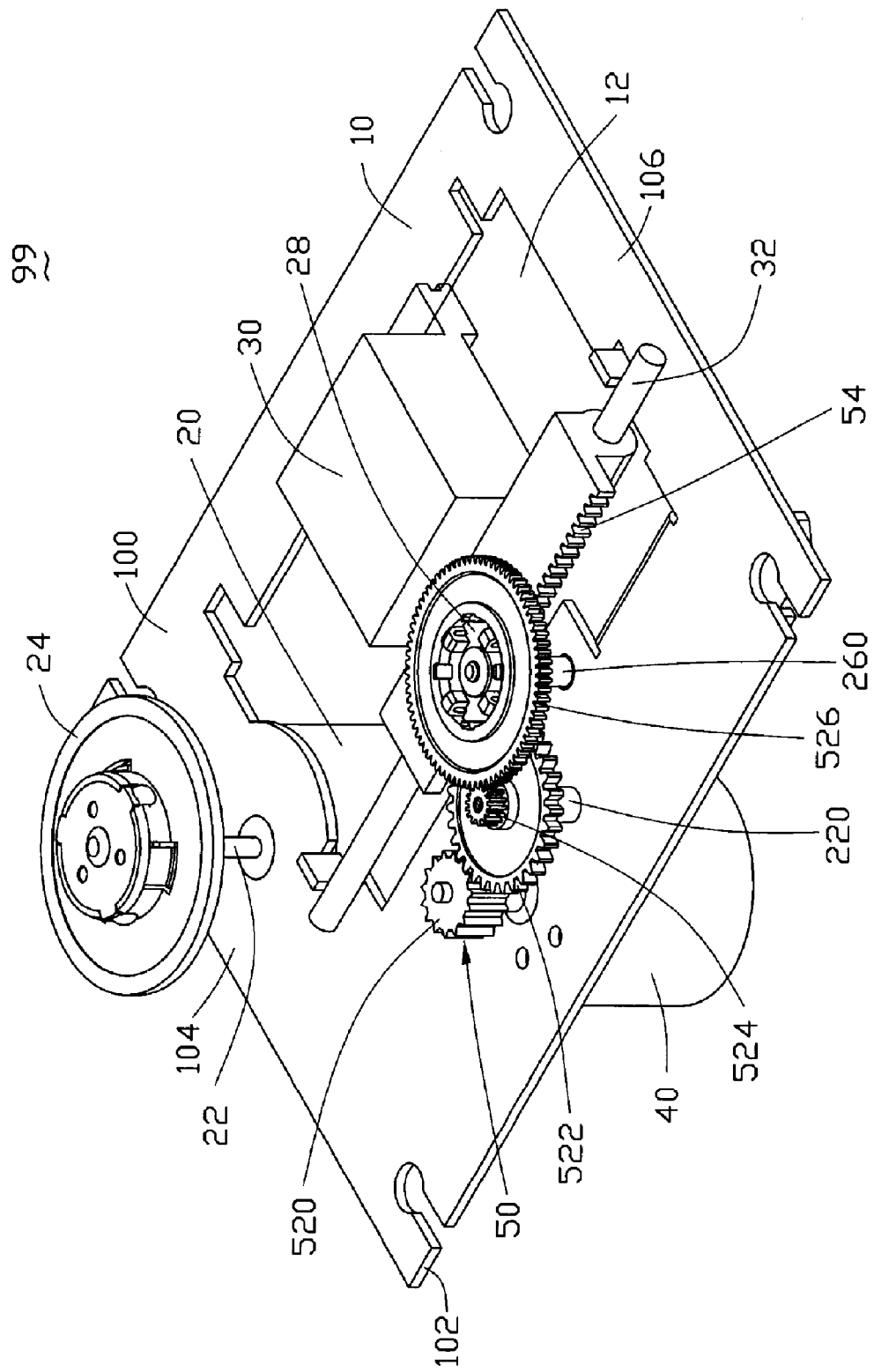
FIG. 1 is an isometric view of an information and/or reproducing apparatus including an energy delivery mechanism in accordance with a preferred embodiment.

Referring to FIG. 1, an information recording and/or reproducing apparatus 99 in accordance with a preferred embodiment includes a base plate 10, a spindle motor 20, a pick-up unit 30, a driving motor 40, and an energy delivery mechanism 50.

The base plate 10 is substantially rectangular, and includes a first side plate 100, a second side plate 102 opposite to the first side plate 100, a third side plate 104 perpendicularly connecting the first and second side plate 100 and 102, and a fourth side plate 106 opposite to the third side plate 103 perpendicularly connecting the first and second side plate 100 and 102. The base plate 10 defines an opening 12 therein. The opening 12 provides a moving space for the pick-up unit 30, so that the pick-up unit 30 is capable of moving in a direction parallel to the first and second side plates 100 and 102.

The spindle motor 20 is mounted on the third side plate 104, and forms a rotor 22 extending through the third side plate 104. A turntable 24 is mounted to a distal end of the rotor 22 for rotatably supporting a disc (not shown).

A guiding rode 32 is used for guiding the pick-up unit 30 to move therealong, and is mounted on the base plate 10. Two ends of the guiding rod 32 are respectively supported by the third side plate 104 and the fourth side plate 106. The pick-up unit 30 includes two supporting arms (not labeled). The two supporting arms are movably supported by the first side plate 100 and the guiding rod 32 respectively.

The driving motor 40 is mounted on the second side plate 102, and is used for converting electrical energy into mechanical energy. The energy delivery mechanism 50 engages with both the driving motor 40 and the pick-up unit 30, and is used for delivering the energy generated by the driving motor 40 to the pick-up unit 30, so as to drive the pick-up unit 30 to move back and forth along the guiding rod 32.

Figure 2:
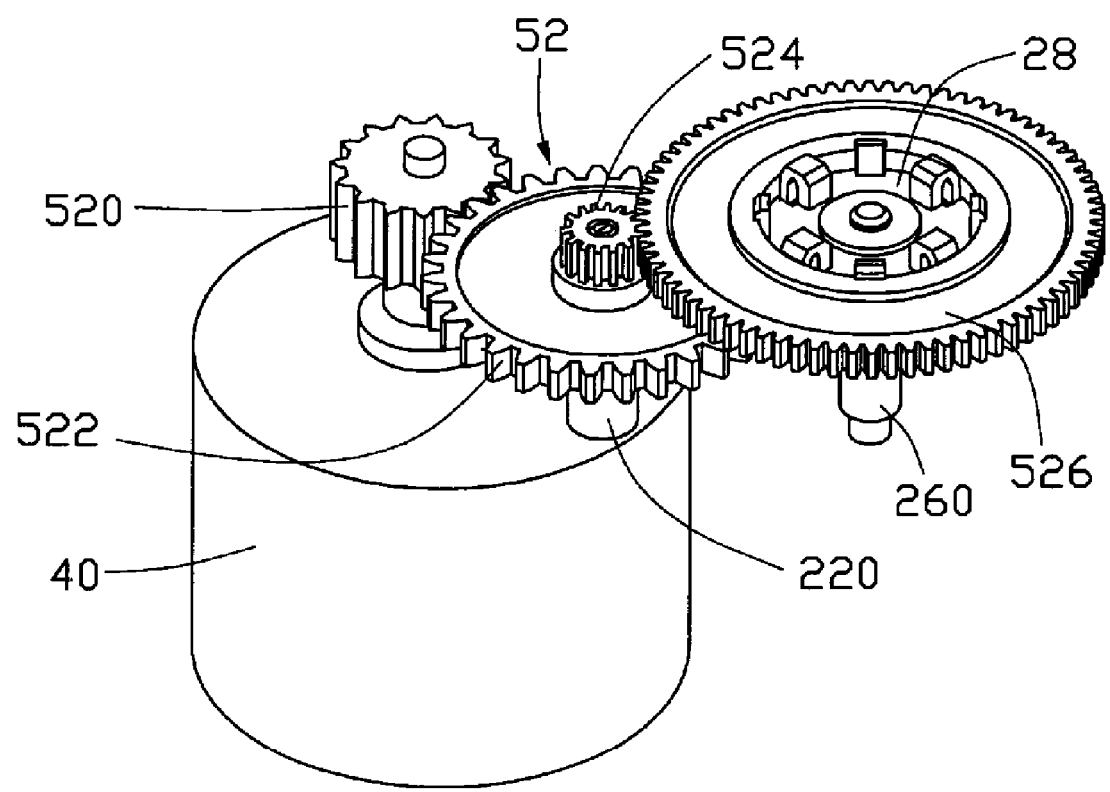
FIG. 2 is an enlarged, assembled view of the energy delivery mechanism of FIG. 1, with a driving motor mounted therewith, the energy delivery mechanism including a third driven gear and a connecting member.

Referring also to FIG. 2, the energy delivery mechanism 50 includes a gear set 52 and a rack 54. The gear set 52 engages with the driving motor 50. The rack 54 is in mesh with the gear set 52, and is secured to the pick-up unit 30. The gear set 52 can be a reduction gear set having one or more levels. In this embodiment, it is presumed that the gear set 52 is a two-level reduction gear set. The gear set 52 includes a driving gear 520, a first driven gear 528 (shown in FIG. 4), a second driven gear 526, a third driven gear 524, and a fourth driven gear 522. The driving gear 520 is connected to the driving motor 40 with a rotor (not labeled) of the driving motor 40 extending through a center thereof. The fourth driven gear 522 is connected to the base plate 10 via a first axle pin 220, and is in mesh with the driving gear 520. In alternative embodiments, the fourth driven gear 522 may be connected to the driving gear 520 via a pulley. Because a diameter of the driving gear 520 is far less than that of the fourth driven gear 522, an angular velocity of the fourth driven gear 522 is slower than that of the driving gear 520. That is, a first level of rotating speed reduction is achieved. The third driven gear 524 is coaxially mounted on the fourth driven gear 522. The second driven gear 526 is mounted on the base plate 10 via a second axle pin 260, and is in mesh with the third driven gear 524. As a diameter of the third driven gear 524 is far less than that of the second driven gear 526, an angular velocity of the second driven gear 526 is slower than that of the third driven gear 524. That is, a second level of rotating speed reduction is achieved. The first driven gear 528 is connected to the second driven gear 526 via a connecting member 28, and is in mesh with the rack 54.

Figure 3:
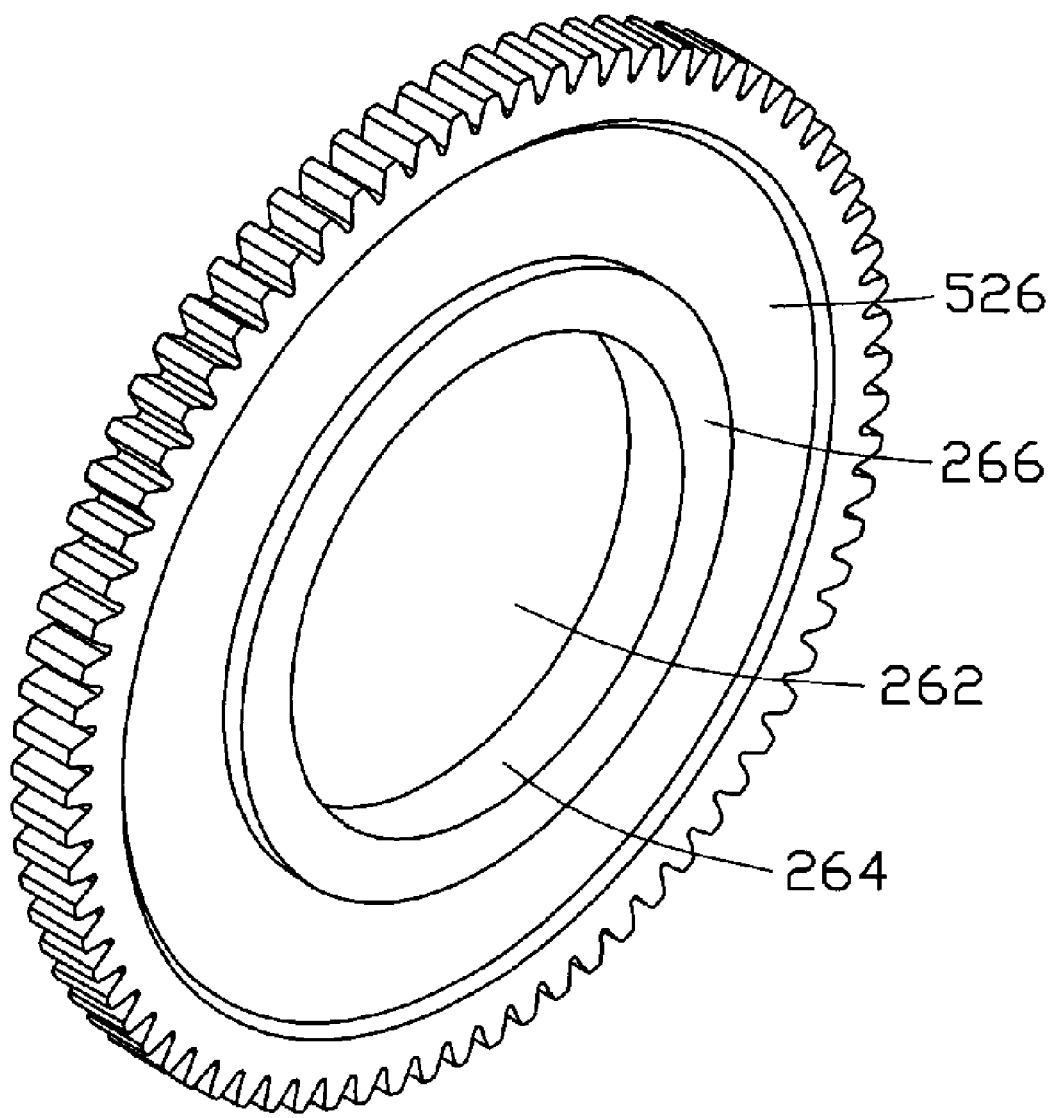
FIG. 3 is an enlarged view of the third driven gear of the energy delivery mechanism of FIG. 2, viewed from another aspect.

Referring also to FIG. 3, the second driven gear 526 defines a first center hole 262 and forms an inner wall 264 surrounding the first center hole 262. A circular flange 266 extends outwardly from a side edge of the inner wall 264. The connecting member 28 is partially received in the first center hole 262 and is engaged with the circular flange 266.

Figure 4:
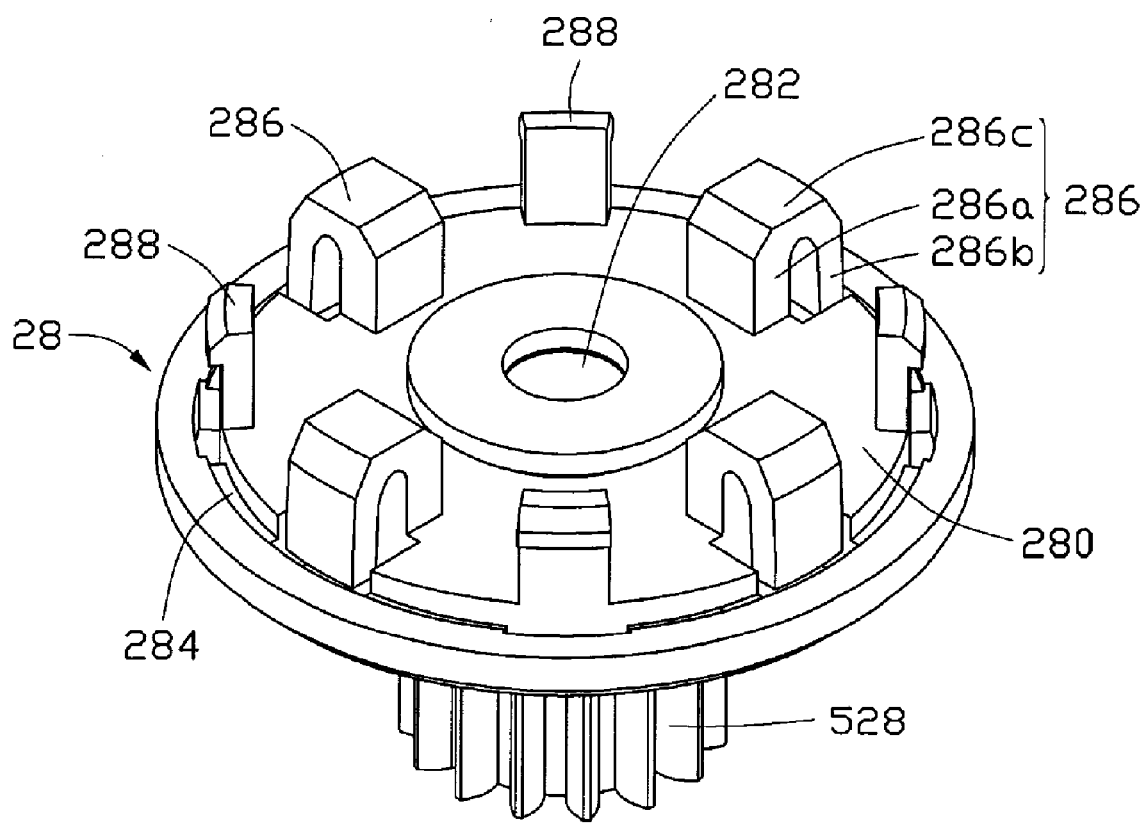
FIG. 4 is an enlarged view of the connecting member of the energy delivery mechanism of FIG. 2, with a fourth driven gear integrately connected thereto.
Figure 5:
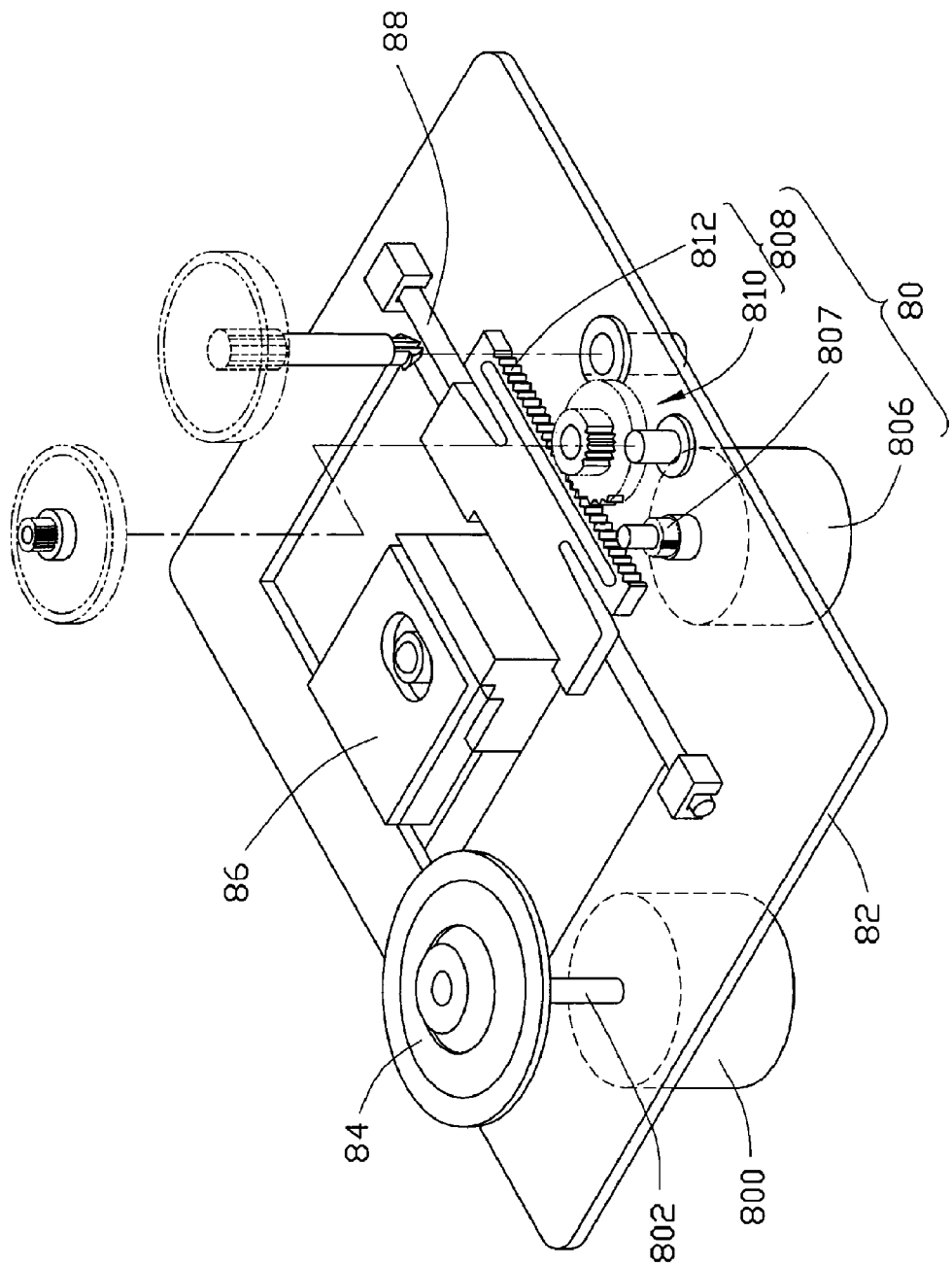
FIG. 5 is an isometric view of a traditional information recording and/or reproducing apparatus.

Referring to FIG. 4, the connecting member 28 is integrally molded with the first driven gear 528. The connecting member 28 includes a substantially circular main body 280 formed at an end of the first driven gear 528. A diameter of the main body 280 is greater than that of the first center hole 262. The main body 280 defines a second center hole 282. The first driven gear 528 defines a center hole (not labeled) corresponding to the second center hole 282. The second axle pin 260 extends successively through the center hole of the first driven gear 528, the second center hole 282, and the first center hole 262. The main body 580 defines a circular groove 284 adjacent to a periphery thereof for receiving the circular flange 266 of the second driven gear 526. The main body 280 forms a plurality of arms 286 and hooks 288 adjacent to the circular groove 284. The arms 286 and the hooks 288 are alternately arranged at the main body 280. The arm 286 includes a fixing portion 286a, a resisting portion 286b, and a connecting portion 286c. The fixing portion 286a is secured to the main body 280. The connecting portion 286c interconnects the fixing portion 286a and the resisting portion 286b. The resisting portion 286 can be deformed when being applied a force toward the second center hole 282. When the connecting member 28 is assembled with the second driven gear 526, the arms 286 resist against the inner wall 264 of the second driven gear 526. The hooks 288 extend upwardly from the main body 280 and catch an inner edge of the second driven gear 526.

When working, the spindle motor 20 generates mechanical energy to bring the turntable 24 to rotate. The driving motor 40 also generates mechanical energy to drive the driving gear 520 to rotate. Whereas the driving gear 520 is in mesh with the fourth driven gear 522, torsion is generated and applied on the fourth driven gear 522 and the fourth driven gear 522 is forced to rotate together with the driving gear 520. Accordingly, the energy is delivered to the fourth driven gear 522. Since the third driven gear 524 is coaxially mounted on the fourth driven gear 522, the third driven gear 524 is forced to rotate in a same angular velocity with the fourth driven gear 522. Because the second driven gear 526 is in mesh with the third driven gear 524, the rotation of the second driven gear 522 produces a torsion that is then applied on the second driven gear 526 and second driven gear 526 is forced to rotate in a same linear velocity with the second driven gear 522. The energy is thus delivered to the second driven gear 526. Since the arms 286 of the connecting member 28 resists against the inner wall 264 of the second driven gear 526, static friction existing between the arms 286 and the inner wall 264 prevents the connecting member 28 from rotating relative to the second driven gear 526 when the second driven gear 526 rotates. The connecting member 28 rotates synchronously together with the third driven gear. Because the first driven gear 528 is integrally molded with the connecting member 28, the energy is delivered to the first driven gear 528 and the first driven gear 528 is forced to rotate. Since the rack 54 is in mesh with the first driven gear 528, rotation of the first driven gear 528 produces a torsion that is then applied on the rack 54. The rack 54 together with the pick-up unit 30 is forced to move along the guiding rod 32. That is, the energy is delivered to the rack 54. A whole energy delivery procedure is thus accomplished.

Whereas the connecting member 28 is forced to rotate due to an existence of static friction during the energy delivery procedure, the connecting member 28 can rotate relative to the second driven gear 526 when a torsion between the gear set 52 and the rack 54 exceeds a maximum static friction between the arms 286 and the inner wall 264. When the pick-up unit 30 moves to an end of the guiding rod, if the torsion applied on the second driven gear 526 still exists, the connecting member 28 together with the first driven gear 528 is forced to rotate due to the existence of the static friction. However, the pick-up unit 30 and the rack 54 have already reached a terminal position and cannot move any more. Torsion is thus produced between the first driven gear 528 and the rack 54. If the torsion exceeds the maximum static friction between the arms 286 and the inner wall 264, the connecting member 28 and the first driven gear 528 rotates relative to the second driven gear 526. Following the relative rotation of the connecting member 28, a sliding friction between the arms 286 and the inner wall 264 is generated. Under action of the sliding friction between the arms 286 and the inner wall 264, the torsion between the first driven gear 528 and the rack 54 is reduced gradually. Therefore, teeth brokenness of the energy delivery mechanism 50 is avoided.

When the information recording and/or reproducing apparatus 99 is subjected to an unexpected and sudden shock, the pick-up unit, together with the rack 54 moves quickly towards an end of the guiding rod 32. However, the driving motor 40 is not in use and the gear set 52 remains static. The movement of the rack 54 produces torsion that is then applied on the first driven gear 528. The first driven gear 528 and the connecting member 28 are forced to rotate. The rotation of the connecting member 28 produces torsion that is then applied on the second driven gear 526. If the torsion exceeds the maximum static friction between the arms 286 and the inner wall 264, the connecting member 526 rotates relative to the second driven gear 526. Following the relative rotation of the connecting member 28, a sliding friction between the arms 286 and the inner wall 264 is generated. Under action of the sliding friction between the arms 286 and the inner wall 264, the torsion between the connecting member 28 and the second driven gear 526 is reduced gradually. Therefore, teeth brokenness of the energy delivery mechanism 50 is avoided.

Otherwise, as the connecting member 28 is integrally molded with the first driven gear 528, the number of parts of the energy delivery mechanism 50 is reduced, this brings a reduced manufacturing cost and makes an assembly of the energy delivery mechanism 50 easy.

It should be noted that in other embodiments, the second driven gear 526 can also be directly connected to the driving gear 520 through a pulley. The connecting member 28 can also be integrally molded with the third driven gear and interact with the first driven gear 528. Besides, the gear set 52 can also be speed increasing. Furthermore, the arms 286 can also not be deformed when being applied a force toward the second center hole 282. In this instance, the arms 286 contact with the inner wall 264 tightly, and static friction exists between the arms 286 and the inner wall 264.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An energy delivery mechanism for an information recording and/or reproducing apparatus, the energy delivery mechanism comprising:
    a first driven gear;
    a second driven gear; and
    a connecting member being secured to the first driven gear, and detachably engaged with the second driven gear, the connecting member being prevented from rotating relative to the second driven gear by static friction existing between the connecting member and the second driven gear.

2. The energy delivery mechanism as claimed in claim 1, wherein the second driven gear defines a center hole and forms a circular inner wall, the connecting member being partially received in the center hole of the second driven gear and resisting against the inner wall, the static friction existing between the connecting member and the inner wall.

3. The energy delivery mechanism as claimed in claim 2, wherein the connecting member comprises a substantially circular main body secured to the first driven gear.

4. The energy delivery mechanism as claimed in claim 3, wherein the connecting member forms an arm extending from the main body adjacent a periphery of the main body, the arm resisting against the inner wall.

5. The energy delivery mechanism as claimed in claim 4, wherein the arm comprises a fixing portion fixed on the main body, a resisting portion for resisting against the inner wall.

6. The energy delivery mechanism as claimed in claim 5, wherein the resisting portion is capable of being deformed when being applied a force towards a center of the main body.

7. The energy delivery mechanism as claimed in claim 3, wherein the connecting member forms a hook adjacent to a periphery of the main body, the hook being configured for catching the second driven gear.

8. The energy delivery mechanism as claimed in claim 1, wherein the connecting member defines a notch, the second driven gear forms a flange corresponding to the notch, the flange being capable of received in the notch.

9. The energy delivery mechanism as claimed in claim 1, wherein the first driven gear is integrately molded with the connecting member.

10. An information recording and/or reproducing apparatus, comprising:
    a base plate;
    a pick-up unit movably mounted on the base plate;
    a driving motor for converting electrical energy into mechanical energy; and
    an energy delivery mechanism for delivering the energy to the pick-up unit to drive the pick-up unit to move relative to the base plate, the energy delivery mechanism comprising a first driven gear, a second driven gear, and a connecting member, the driving gear being secured to the first driven gear and detachably engaging with the second driven gear, the connecting member being prevented from rotating relative to the second driven gear by static friction existing between the connecting member and the second driven gear.

11. The information recording and/or reproducing apparatus as claimed in claim 10, wherein the second driven gear defines a center hole and forms a circular inner wall, the connecting member being partially received in the center hole of the second driven gear and resisting against the inner wall, the static friction existing between the connecting member and the inner wall.

12. The information recording and/or reproducing apparatus as claimed in claim 11, the connecting member comprises a main body secured to the first driven gear, and an arm extending from the main body, the arm resisting the inner wall.

13. The information recording and/or reproducing apparatus as claimed in claim 12, wherein the connecting member forms a hook adjacent to a periphery of the man body, the hook catching the second driven gear.

14. The information recording and/or reproducing apparatus as claimed in claim 12, wherein the arm comprises a fixing portion fixed on the main body, a resisting portion for resisting against the inner wall.

15. The information recording and/or reproducing apparatus as claimed in claim 14, wherein the resisting portion is capable of being deformed when being applied a force towards a center of the main body.

16. The information recording and/or reproducing apparatus as claimed in claim 10, wherein the connecting member defines a notch, the second driven gear forms a flange corresponding to the notch, the flange being capable of received in the notch.

17. The information recording and/or reproducing apparatus as claimed in claim 10, wherein the energy delivery mechanism comprises a rack in mesh with the first driven gear.

18. An energy delivery mechanism for an information recording and/or reproducing apparatus, the energy delivery mechanism comprising:
   a first driven gear;
   a second driven gear defining a center hole and forming an inner wall; and
   a connecting member secured to the first driven gear, the connecting member being partially received in the center hole of the second driven gear and resisting against the inner wall of the second driven gear.

19. The energy delivery mechanism as claimed in claim 18, wherein the connecting member comprises a main body secured to the first driven gear, and an arm extending from the main body, the arm resisting against the inner wall.

20. The energy delivery mechanism as claimed in claim 19, wherein the connecting member forms a hook adjacent to a periphery of the man body, the hook catching the second driven gear.

\* \* \* \* \*